United States Patent
Zhan et al.

(10) Patent No.: US 12,532,425 B2
(45) Date of Patent: Jan. 20, 2026

(54) FOLDABLE HINGE AND ELECTRONIC DEVICE INCLUDING SUPPORTING COMPONENT WITH ARC SHAPE

(71) Applicant: HUAWEI TECHNOLOGIES CO., LTD., Shenzhen (CN)

(72) Inventors: Qiang Zhan, Shanghai (CN); Ding Zhong, Dongguan (CN); Leilei Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 18/626,021

(22) Filed: Apr. 3, 2024

(65) Prior Publication Data

US 2024/0251515 A1    Jul. 25, 2024

Related U.S. Application Data

(63) Continuation of application No. PCT/CN2022/128648, filed on Oct. 31, 2022.

(30) Foreign Application Priority Data

Nov. 9, 2021  (CN) .......................... 202111322650.4

(51) Int. Cl.
 *H05K 5/02* (2006.01)
 *E05D 3/12* (2006.01)
(52) U.S. Cl.
 CPC ........... *H05K 5/0226* (2013.01); *E05D 3/122* (2013.01); *E05Y 2999/00* (2024.05)

(58) Field of Classification Search
 CPC ... H05K 5/0226; G06F 1/1616; G06F 1/1652; G06F 1/1681; G06F 1/1641; G06F 1/16;
 (Continued)

(56) References Cited

U.S. PATENT DOCUMENTS

2021/0181808 A1* 6/2021 Liao .................... H04M 1/0216
2021/0368032 A1* 11/2021 Liao ...................... G06F 1/1681
(Continued)

FOREIGN PATENT DOCUMENTS

| CN | 111726442 B | 6/2021 |
| CN | 113194183 A | 7/2021 |

(Continued)

*Primary Examiner* — Abhishek M Rathod
(74) *Attorney, Agent, or Firm* — Leydig, Voit & Mayer, Ltd.

(57) ABSTRACT

A foldable hinge includes a base and two folding assemblies. The two folding assemblies are located on two sides of the base, are both connected to the base, and are capable of being opened or closed relative to each other. Each of the two folding assemblies includes a first swing arm, a second swing arm, a synchronous gear, and a support component. The first swing arm is pivotally connected to the base. The second swing arm is pivotally connected to the base. The synchronous gear is located in the base, and the first swing arm and the second swing arm are connected through transmission by using the synchronous gear. The support component is pivotally connected to the first swing arm, is linked to the second swing arm, and is capable of rotating relative to the first swing arm under an action of the second swing arm.

16 Claims, 11 Drawing Sheets

(58) Field of Classification Search
CPC .... G06F 1/1624; G06F 1/1675; H04M 1/022; H04M 1/0268; H04M 1/0216
See application file for complete search history.

(56) References Cited

U.S. PATENT DOCUMENTS

2022/0159856 A1* 5/2022 Xie ........................ G06F 1/1681
2022/0303371 A1* 9/2022 Liao .................... H04M 1/0268

FOREIGN PATENT DOCUMENTS

| CN | 113315860 A | 8/2021 |
|----|-------------|--------|
| EP | 3859721 A1 | 8/2021 |
| WO | 2021115462 A1 | 6/2021 |

* cited by examiner

FOLDABLE HINGE AND ELECTRONIC DEVICE INCLUDING SUPPORTING COMPONENT WITH ARC SHAPE

CROSS-REFERENCE TO RELATED APPLICATIONS

This application is a continuation of International Application No. PCT/CN2022/128648, filed on Oct. 31, 2022, which claims priority to Chinese Patent Application No. 202111322650.4, filed on Nov. 9, 2021. The disclosures of the aforementioned applications are hereby incorporated by reference in their entireties.

TECHNICAL FIELD

The present disclosure relates to the field of mobile terminals, and in particular, to a foldable hinge and an electronic device including the foldable hinge.

BACKGROUND

With the development of technologies, electronic devices are increasingly widely used, and have become an important tool in people's daily life and work. Foldable electronic devices are favored by people due to small occupied space and being easy to carry.

A foldable electronic device usually includes two housings, a foldable hinge, and a flexible screen. The two housings are respectively connected to two sides of the foldable hinge, and the two housings can be opened or closed relative to each other under an action of the foldable hinge. The flexible screen is located on a same side of the two housings and the foldable hinge, and the flexible screen is connected to the housings, so that the flexible screen is folded or unfolded in a process in which the two housings are opened or closed relative to each other. In a state in which the foldable hinge is unfolded, the flexible screen is unfolded on a surface of the two housings and the foldable hinge.

To have sufficient space to accommodate a bending part of the flexible screen in a folded state, and prevent the flexible screen from being damaged, the foldable hinge may form space with a water drop-shaped cross section after being folded. In a conventional technology, to form the space with a water drop-shaped cross section after the foldable hinge is folded, the foldable hinge usually has a complex structure.

SUMMARY

Embodiments of the present disclosure provide a foldable hinge and an electronic device, to resolve a problem in a conventional technology. The technical solutions are as follows.

According to a first aspect, an embodiment of the present disclosure provides a foldable hinge. The foldable hinge includes a base and two folding assemblies. The two folding assemblies are located on two sides of the base, are both connected to the base, and are capable of being opened or closed relative to each other. The two folding assemblies each includes a first swing arm, a second swing arm, a synchronous gear, and a support component. The first swing arm is pivotally connected to the base. The second swing arm is pivotally connected to the base, and a pivotal connection axis between the second swing arm and the base is parallel to a pivotal connection axis between the first swing arm and the base. The synchronous gear is located in the base. The first swing arm and the second swing arm are connected through transmission by using the synchronous gear. The support component is pivotally connected to the first swing arm. The support component is further linked to the second swing arm. The support component is capable of rotating relative to the first swing arm under an action of the second swing arm. The support component is configured to provide support for a flexible screen. When the two folding assemblies are unfolded relative to each other, the support components of the two folding assemblies are coplanar.

Based on the foregoing features, because the first swing arm and the second swing arm are both pivotally connected to the base, both the first swing arm and the second swing arm are capable of rotating relative to the base. The first swing arm and the second swing arm are connected through transmission by using the synchronous gear. Therefore, when either of the first swing arm and the second swing arm rotates relative to the base, the other of the first swing arm and the second swing arm also rotates relative to the base under an action of the synchronous gear.

In a process in which the second swing arm rotates, the second swing arm drives the support component, to enable the support component to rotate relative to the first swing arm. In other words, the support component rotates relative to the base together with the first swing arm, and rotates relative to the first swing arm. Therefore, when the two folding assemblies are folded, the two support components are enabled to present a specific included angle. Transmission between the first swing arm and the second swing arm is performed by using the synchronous gear. This has a simple structure, is convenient for manufacturing, and has low costs.

Optionally, a transmission ratio of the synchronous gear to the first swing arm is less than a transmission ratio of the synchronous gear to the second swing arm.

Based on the foregoing features, in a process in which the two folding assemblies are folded relative to each other, a rotation angle of the first swing arm may be greater than a rotation angle of the second swing arm. In this way, the support component rotates by a specific included angle relative to the first swing arm, so that the support components of the two folding assemblies are inclined relative to each other, and limit drop-shaped space with the base.

In some examples, the first swing arm and the second swing arm are spaced apart in a direction parallel to an axis of the synchronous gear. The first swing arm includes a first main body portion and a first gear portion, and the first gear portion is located on a side that is of the first main body portion and that is close to the second swing arm. The second swing arm includes a second main body portion and a second gear portion, and the second gear portion is located on a side that is of the second main body portion and that is close to the first swing arm. The synchronous gear is located between the first main body portion and the second main body portion, and is engaged with the first gear portion and the second gear portion.

Based on the foregoing features, when the first swing arm rotates, the synchronous gear may be driven to rotate, and then the synchronous gear drives the second swing arm to rotate. The first swing arm and the second swing arm move stably and have high motion precision through gear transmission.

For example, a diameter of the first gear portion is less than a diameter of the second gear portion. Therefore, in this way, a transmission ratio of the synchronous gear to the first gear portion is less than a transmission ratio of the synchronous gear to the second gear portion.

Optionally, orthographic projections of the first gear portion and the second gear portion on a plane perpendicular to the axis of the synchronous gear at least partially overlap.

Based on the foregoing features, the first gear portion and the second gear portion are arranged close, and the orthographic projections of the first gear portion and the second gear portion on the plane perpendicular to the axis of the synchronous gear at least partially overlap, so that an overall structure of the foldable hinge is more compact.

Optionally, a spacing between axes of synchronous gears of the two folding assemblies is less than a spacing between pivotal connection axes between first swing arms of the two folding assemblies and the base, and less than a spacing between pivotal connection axes between second swing arms of the two folding assemblies and the base. This helps reduce a volume of the base, so that a size of the foldable hinge can be designed to be smaller and a structure is more compact.

In some examples, the synchronous gears of the two folding assemblies are engaged. Based on the foregoing features, the two synchronous gears are engaged, so that the two folding assemblies can move synchronously in a process of folding and unfolding the two folding assemblies.

In some examples, the first swing arm further includes a first end face cam. The first end face cam is located on a side that is of the first main body portion and that is far away from the first gear portion. The first end face cam is coaxially arranged with the first gear portion.

The foldable hinge further includes a damping mechanism. The damping mechanism is located in the base and is located on the side that is of the first main body portion and that is far away from the first gear portion. The damping mechanism fits an end face that is of the first end face cam and that is far away from the first main body portion.

Based on the foregoing features, the damping mechanism fits the first end face cam to provide resistance to the first swing arm and hinder rotation of the first swing arm. When folding is performed through an external force, an external force exerted on the first swing arm exceeds resistance exerted on the first swing arm by the damping mechanism, and the first swing arm can rotate. After the external force is removed, the resistance provided by the damping mechanism hinders the rotation of the first swing arm, so that the first swing arm can be kept at a current position, and an electronic device is prevented from automatically folding or unfolding under an action of gravity.

Optionally, the damping mechanism includes a second end face cam and an elastic component. The second end face cam is located on an end that is of the first end face cam and that is far away from the first main body portion, and the second end face cam is coaxially arranged with the first end face cam. The elastic component is located on an end that is of the second end face cam and that is far away from the first end face cam. The elastic component is configured to provide an elastic force, to enable the second end face cam to touch the first end face cam.

Based on the foregoing structure, when the first swing arm rotates, the first end face cam and the second end face cam rotate relative to each other. Under an action of the elastic force of the elastic component, the second end face cam abuts against the first end face cam, so that the first end face cam and the second end face cam are kept at stable positions, thereby avoiding automatically opening or closing of the electronic device in a case of a factor such as gravity.

In some examples, the support component includes a plate body and an arc-shaped arm. The arc-shaped arm is located on a side that is of the plate body and that is close to the first swing arm, and is located on a side of the first swing arm. An end of the arc-shaped arm is connected to the plate body, and the other end extends in a direction away from the base. A side wall that is of the first swing arm and that is close to the arc-shaped arm has an arc-shaped groove. The arc-shaped arm is located in the arc-shaped groove, and is capable of sliding along the arc-shaped groove.

Based on the foregoing features, the arc-shaped arm fits the arc-shaped groove, so that the support component can rotate around an axis of the arc-shaped groove relative to the first swing arm.

The arc-shaped arm fits the arc-shaped groove to implement a pivotal connection. Both the arc-shaped arm and the arc-shaped groove are in an arc shape. A pivotal connection axis is located at an axis of the arc-shaped arm or the arc-shaped groove. Radiuses of the arc-shaped arm and the arc-shaped groove are changed, so that a position of the pivotal connection axis can be changed. In this way, an arrangement of the support component is more flexible.

In some examples, the support component further includes a driving portion. The driving portion and the arc-shaped arm are located on a same side of the plate body, and the driving portion is located on a side of the second swing arm. The driving portion has a driving groove. The driving groove is located on a side that is of the driving portion and that is close to the second swing arm. A side wall of the second swing arm has a driving protrusion. The driving protrusion is located on a side that is of the second swing arm and that is close to the driving portion, and is partially located in the driving groove.

Based on the foregoing features, when the second swing arm rotates relative to the base, the driving protrusion touches a side wall of the driving groove, and squeezes the side wall of the driving groove to push the driving portion. In this way, the support component rotates around a pivotal connection axis between the support component and the first swing arm, so that the support component is driven by the second swing arm, and the support component is linked to the second swing arm.

According to a second aspect, an embodiment of the present disclosure further provides an electronic device. The electronic device includes a foldable hinge, a first housing, a second housing, and a flexible screen. The foldable hinge is any foldable hinge according to the first aspect. The first housing is connected to a first swing arm of one folding assembly in the foldable hinge. The second housing is connected to a first swing arm of the other folding assembly in the foldable hinge. The flexible screen is located on a same side of the foldable hinge, the first housing, and the second housing, and is connected to the first housing and the second housing.

Based on the foregoing features, in a process of opening or closing the first housing and the second housing, a support component may perform a double-rotation motion, and the support component rotates relative to a base together with the first swing arm, and rotates relative to the first swing arm. Before and after folding is performed, relative positions of the support component and the first swing arm may change, so that when the two folding assemblies are folded, two support components present a specific included angle, and enclose water drop-shaped space with the base to accommodate the flexible screen. Transmission between the first swing arm and a second swing arm is performed by using a synchronous gear. This has a simple structure, is convenient for manufacturing, and has low costs.

REFERENCE NUMERALS

100: foldable hinge;
110: base;
120: folding assembly; 121: first swing arm; 1211: first main body portion; 1211a: arc-shaped groove; 1212: first gear portion; 1213: first end face cam;
122: second swing arm; 1221: second main body portion; 1222: second gear portion, 1223: driving protrusion;
123: synchronous gear;
124: support component; 1241: plate body; 1242: arc-shaped arm; 1243: driving portion; 1243a: driving groove;
131: first pin shaft; 132: second pin shaft; 133: third pin shaft;
140: damping mechanism; 1401: second end face cam; 1402: elastic component; 1403: snap ring;
150: top plate;
200: first housing; 300: second housing; 400: flexible screen; 500: bottom plate.

DESCRIPTION OF EMBODIMENTS

Terms used in an implementation part of the present disclosure are merely used to explain embodiments of the present disclosure, and are not intended to limit the present disclosure. Unless otherwise defined, technical terms or scientific terms used in an implementation of the present disclosure should have a common meaning understood by a person with a general skill in the art of the present disclosure. In this specification and claims of the present disclosure, words "first", "second", "third", and the like are not intended to indicate any order, quantity, or significance, but are intended to distinguish between different components. Likewise, words such as "a/an" or "one" are not intended to indicate a quantity limitation either, but are intended to indicate that at least one exists. Words such as "comprise" or "include" mean that the elements or objects before "comprise" or "include" cover the elements or objects and their equivalents listed after "comprise" or "include", and other elements or objects are not excluded. Words such as "connection" or "connect to" are not limited to a physical or mechanical connection, but may include an electrical connection, whether directly or indirectly. "Upper", "lower", "left", "right", and the like are merely used to indicate a relative location relationship. When an absolute location of a described object changes, the relative location relationship may also change accordingly.

Figure 1:
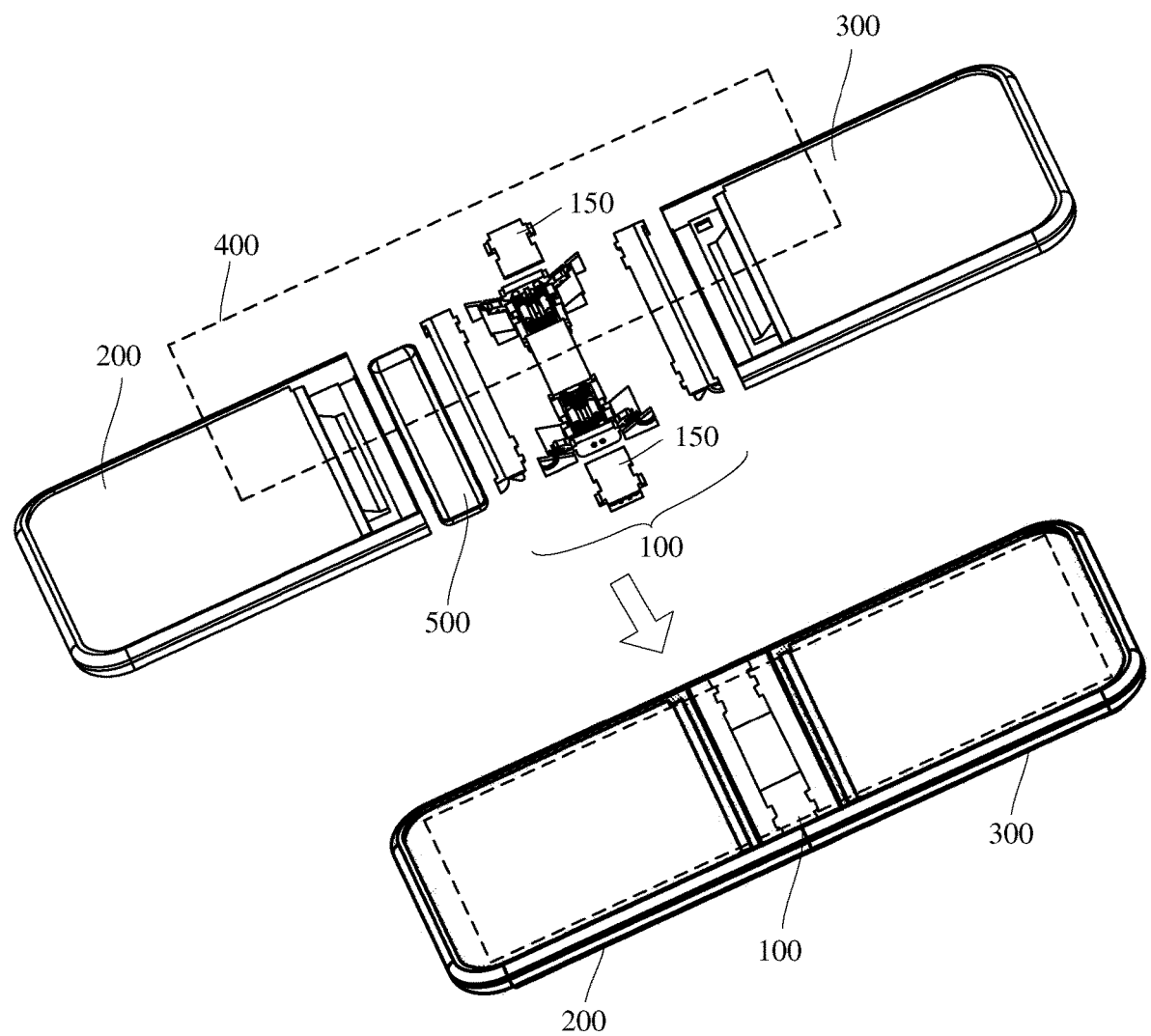
FIG. 1 is a schematic diagram of a structure of an electronic device according to an embodiment of the present disclosure.

FIG. 1 is a schematic diagram of a structure of an electronic device according to an embodiment of the present disclosure. The electronic device may be but is not limited to a mobile phone, a tablet computer, a display, or a notebook computer.

As shown in FIG. 1, the electronic device includes a foldable hinge 100, a first housing 200, a second housing 300, and a flexible screen 400. The flexible screen 400 is located on a same side of the foldable hinge 100, the first housing 200, and the second housing 300, and the flexible screen 400 is connected to the first housing 200 and the second housing 300.

The first housing 200 and the second housing 300 can be opened or closed relative to each other. When the first housing 200 and the second housing 300 are unfolded, the flexible screen 400 is unfolded on a surface of the foldable hinge 100, the first housing 200, and the second housing 300. When the first housing 200 and the second housing 300 are folded relative to each other, the flexible screen 400 is folded between the first housing 200 and the second housing 300.

Figure 2:
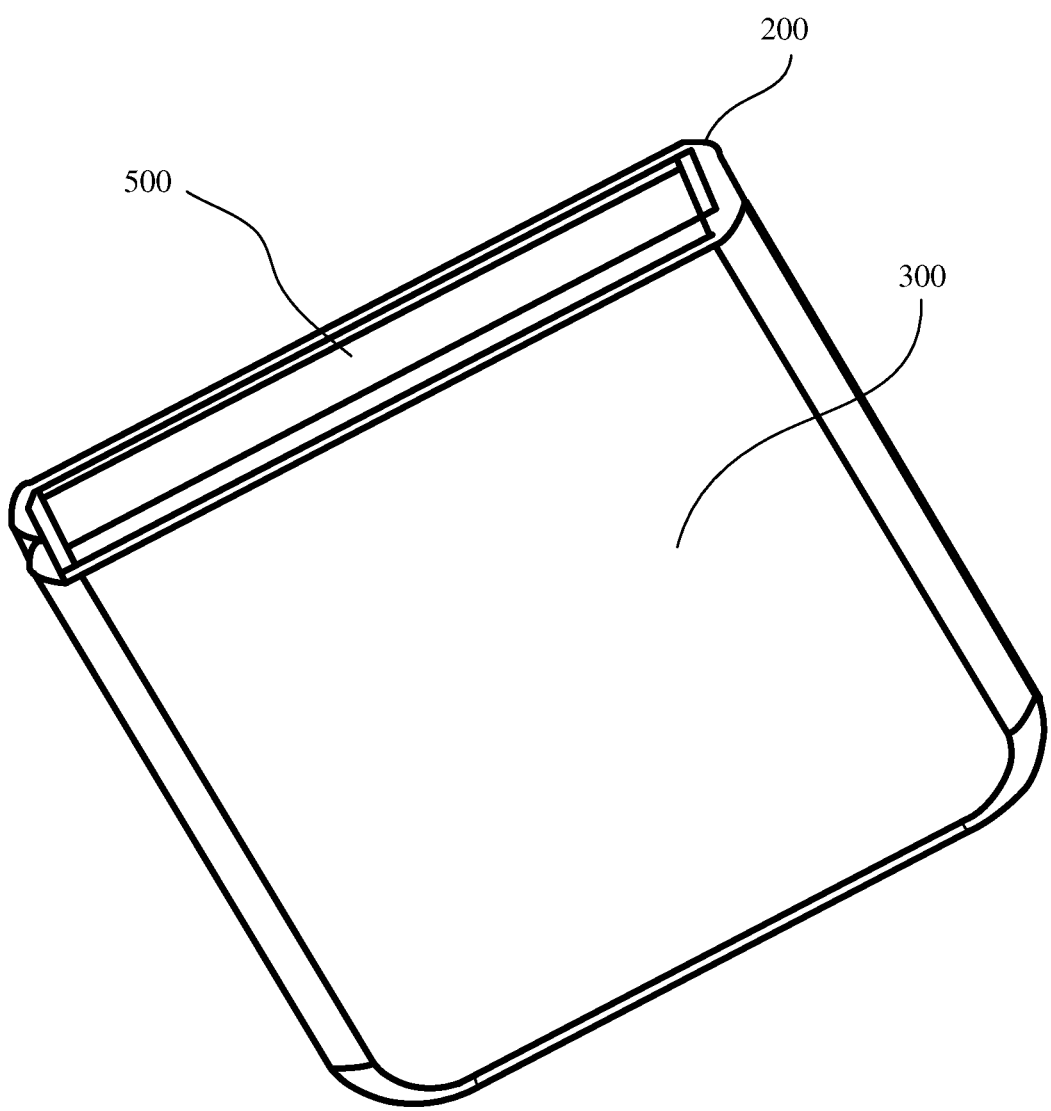
FIG. 2 is a schematic diagram of a structure of an electronic device according to an embodiment of the present disclosure.
Figure 3:
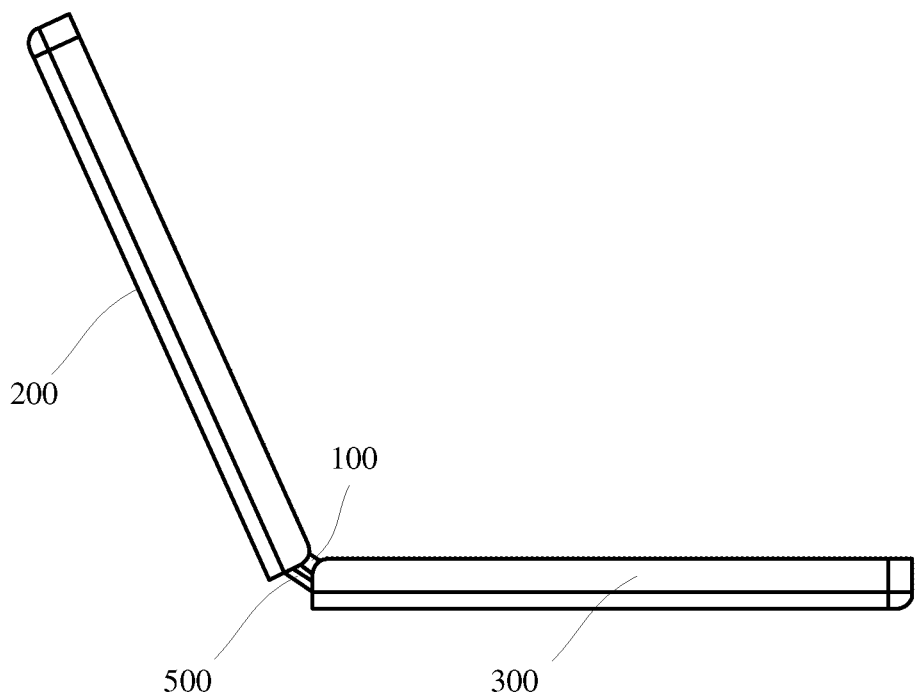
FIG. 3 is a schematic diagram of a structure of an electronic device according to an embodiment of the present disclosure.

As shown in FIG. 1, the electronic device further includes a bottom plate 500. FIG. 2 is a schematic diagram of a structure of an electronic device according to an embodiment of the present disclosure. FIG. 2 shows a folded state of the electronic device. In the state shown in FIG. 2, the bottom plate 500 is located at the bottom of the foldable hinge 100. In the folded state, the bottom plate 500 is exposed between the first housing 200 and the second housing 300, to form a part of an outer surface of the electronic device. FIG. 3 is a schematic diagram of a structure of an electronic device according to an embodiment of the present disclosure. In FIG. 3, the electronic device is in a semi-folded state, that is, is in a form between a folded state and an unfolded state. As shown in FIG. 3, the bottom plate 500 is indented between the first housing 200 and the second housing 300 under driving of the foldable hinge 100. When the first housing 200 and the second housing 300 are in the unfolded state, referring to the state shown in FIG. 1, the bottom plate 500 is hidden between the first housing 200 and the second housing 300.

Figure 4:
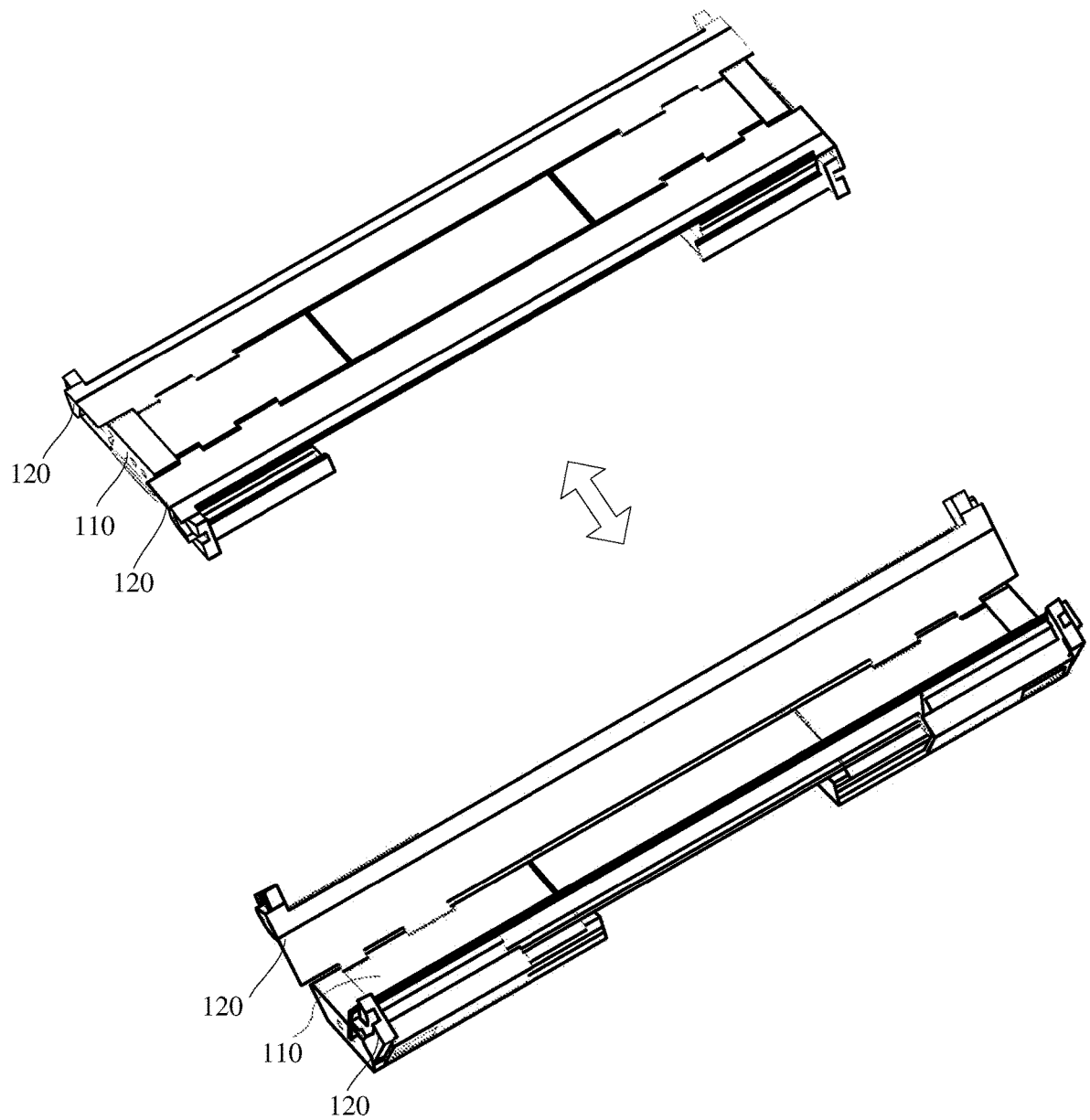
FIG. 4 is a schematic diagram of a structure of a foldable hinge according to an embodiment of the present disclosure.

FIG. 4 is a schematic diagram of a structure of a foldable hinge according to an embodiment of the present disclosure. As shown in FIG. 4, the foldable hinge includes a base 110 and two folding assemblies 120. The two folding assemblies 120 are located on two sides of the base 110, and the two folding assemblies 120 are both connected to the base 110 and are capable of being opened or closed relative to each other. One of the two folding assemblies 120 is configured to be connected to the first housing 200, and the other of the two folding assemblies 120 is configured to be connected to the second housing 300. In a folding process, the two folding assemblies 120 move close to each other, and drive the first housing 200 and the second housing 300 to move close to each other.

Figure 5:
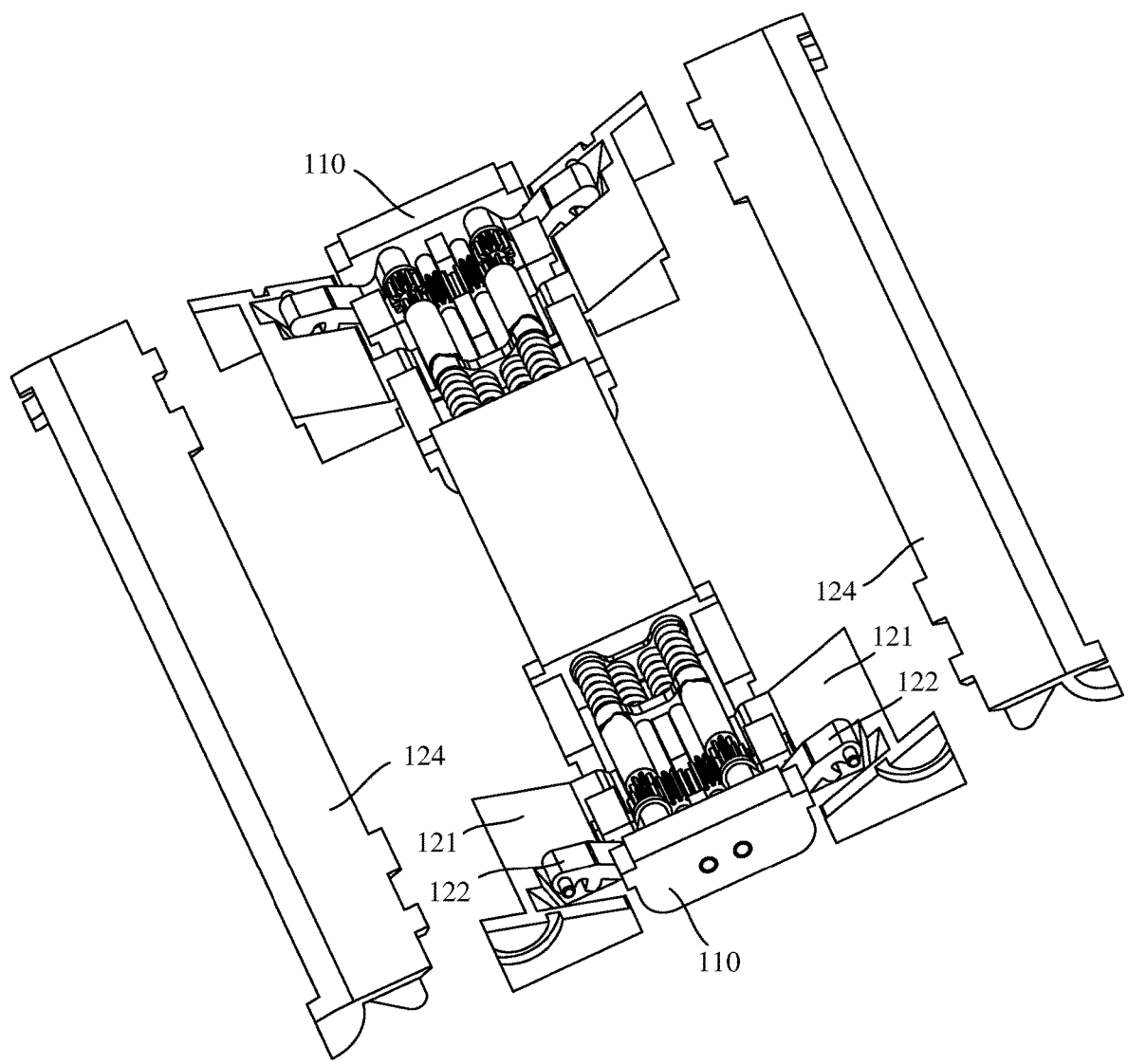
FIG. 5 is a schematic diagram of a structure of a foldable hinge according to an embodiment of the present disclosure.
Figure 6:
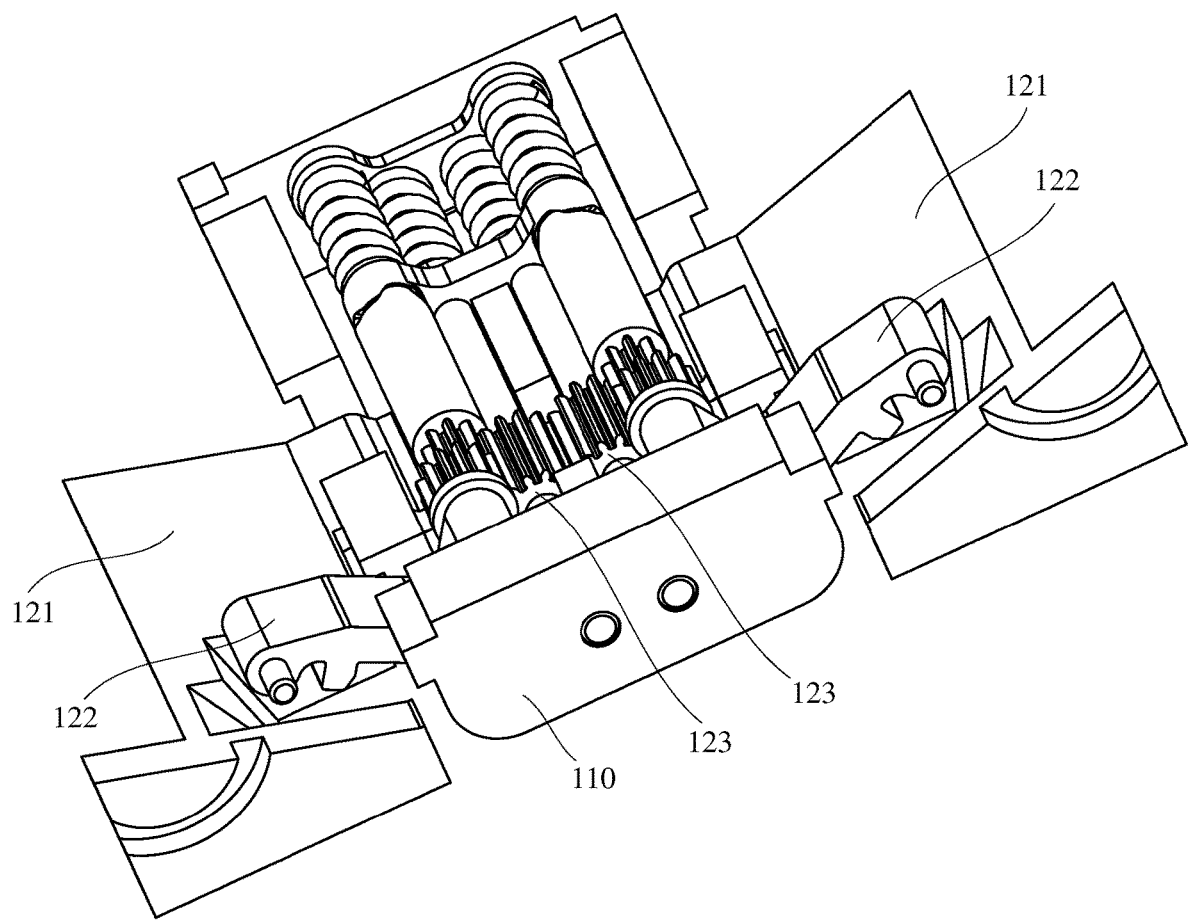
FIG. 6 is a schematic diagram of partial enlargement of FIG. 5.

FIG. 5 is a schematic diagram of a structure of a foldable hinge according to an embodiment of the present disclosure. FIG. 6 is a schematic diagram of partial enlargement of the foldable hinge in FIG. 5. As shown in FIG. 5 and FIG. 6, the folding assembly 120 includes a first swing arm 121, a second swing arm 122, a synchronous gear 123, and a support component 124.

Figure 7:
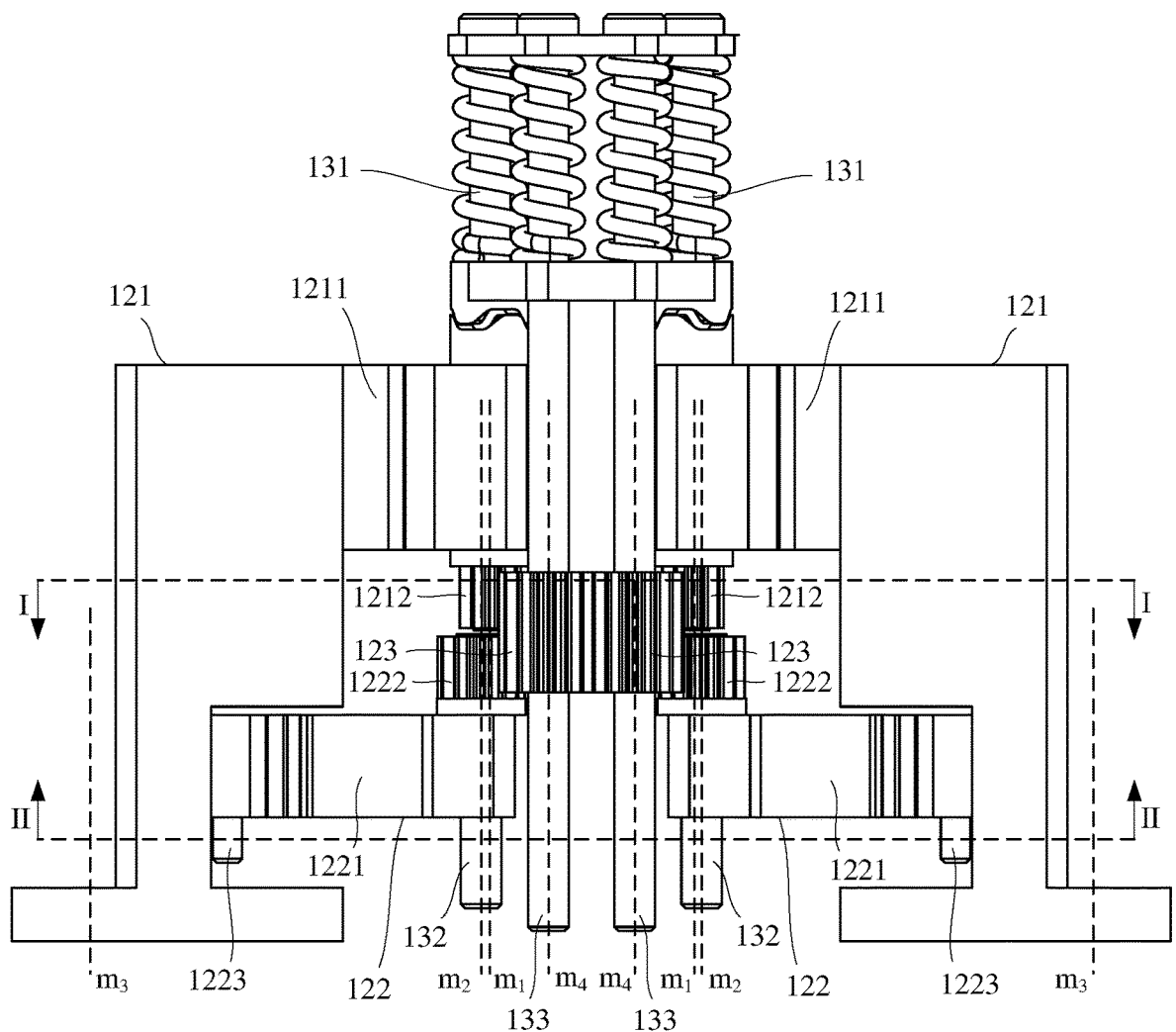
FIG. 7 is a top view of a foldable hinge shown in FIG. 6.

FIG. 7 is a top view of the foldable hinge shown in FIG. 6. At least the base 110 and the support component 124 are not shown in FIG. 7. As shown in FIG. 7, the first swing arm 121 is pivotally connected to the base 110. FIG. 7 shows a pivotal connection axis $m_1$ between the first swing arm 121 and the base 110.

The second swing arm 122 is pivotally connected to the base 110. FIG. 7 shows a pivotal connection axis $m_2$ between the first swing arm 121 and the base 110. The pivotal connection axis $m_2$ between the second swing arm 122 and the base 110 is parallel to the pivotal connection axis $m_1$ between the first swing arm 121 and the base 110.

The synchronous gear 123 is located in the base 110, and the first swing arm 121 and the second swing arm 122 are connected through transmission by using the synchronous gear 123. In this way, when the first swing arm 121 rotates around the pivotal connection axis $m_1$, the synchronous gear 123 can drive the second swing arm 122 to rotate around the pivotal connection axis $m_2$.

The support component 124 is pivotally connected to the first swing arm 121. FIG. 7 shows a pivotal connection axis $m_3$ between the support component 124 and the first swing arm 121. The support component 124 is linked to the second swing arm 122, and the support component 124 is capable of rotating relative to the first swing arm 121 under an action of the second swing arm 122. When the first swing arm 121 rotates, the first swing arm 121 drives the synchronous gear 123 to rotate, and then the synchronous gear 123 drives the second swing arm 122 to rotate. The support component 124 rotates around the pivotal connection axis $m_3$ under an action of the second swing arm 122.

The support component 124 is configured to provide support for the flexible screen 400. When the two folding assemblies 120 are unfolded relative to each other, support components 124 of the two folding assemblies 120 are coplanar, to support the flexible screen 400 in an unfolded state.

In this embodiment of the present disclosure, because the first swing arm 121 and the second swing arm 122 are both pivotally connected to the base 110, both the first swing arm 121 and the second swing arm 122 are capable of rotating relative to the base 110. In addition, the first swing arm 121 and the second swing arm 122 are connected through transmission by using the synchronous gear 123. Therefore, when one of the first swing arm 121 and the second swing arm 122 rotates relative to the base 110, the synchronous gear 123 may drive the other of the first swing arm 121 and the second swing arm 122 to rotate relative to the base 110. The support component 124 is pivotally connected to the first swing arm 121. In a process in which the second swing arm 122 rotates, the second swing arm 122 drives the support component 124, to enable the support component 124 to rotate relative to the first swing arm 121. In this way, in a process in which the two folding assemblies 120 are folded relative to each other, the support component 124 may perform a double-rotation motion. That is, the support component 124 rotates relative to the base 110 together with the first swing arm 121, and rotates relative to the first swing arm 121. In this way, before and after folding is performed, relative positions of the support component 124 and the first swing arm 121 may change, so that when the two folding assemblies 120 are folded, the two support components 124 may present a specific included angle. Transmission between the first swing arm 121 and the second swing arm 122 is performed by using the synchronous gear 123. This has a simple structure, is convenient for manufacturing, and has low costs.

In this embodiment of the present disclosure, a transmission ratio of the synchronous gear 123 to the first swing arm 121 is less than a transmission ratio of the synchronous gear 123 to the second swing arm 122.

To be specific, when the first swing arm 121 rotates and drives the synchronous gear 123 and the second swing arm 122 to rotate together, if a rotation angle of the first swing arm 121 is $\alpha_1$, a rotation angle of the synchronous gear 123 is $\alpha_2$, and a rotation angle of the second swing arm 122 is $\alpha_3$, $\alpha_2/\alpha_1 < \alpha_2/\alpha_3$. It can be learned that $\alpha_3 < \alpha_1$. The foldable hinge changes from an unfolded state to a folded state, the rotation angle of the first swing arm 121 is greater than the rotation angle of the second swing arm 122, and relative positions of the first swing arm 121 and the second swing arm 122 may change. The support component 124 is pivotally connected to the first swing arm 121. When a position of the second swing arm 122 relative to the first swing arm 121 changes, the support component 124 is enabled to rotate relative to the first swing arm 121.

Figure 8:
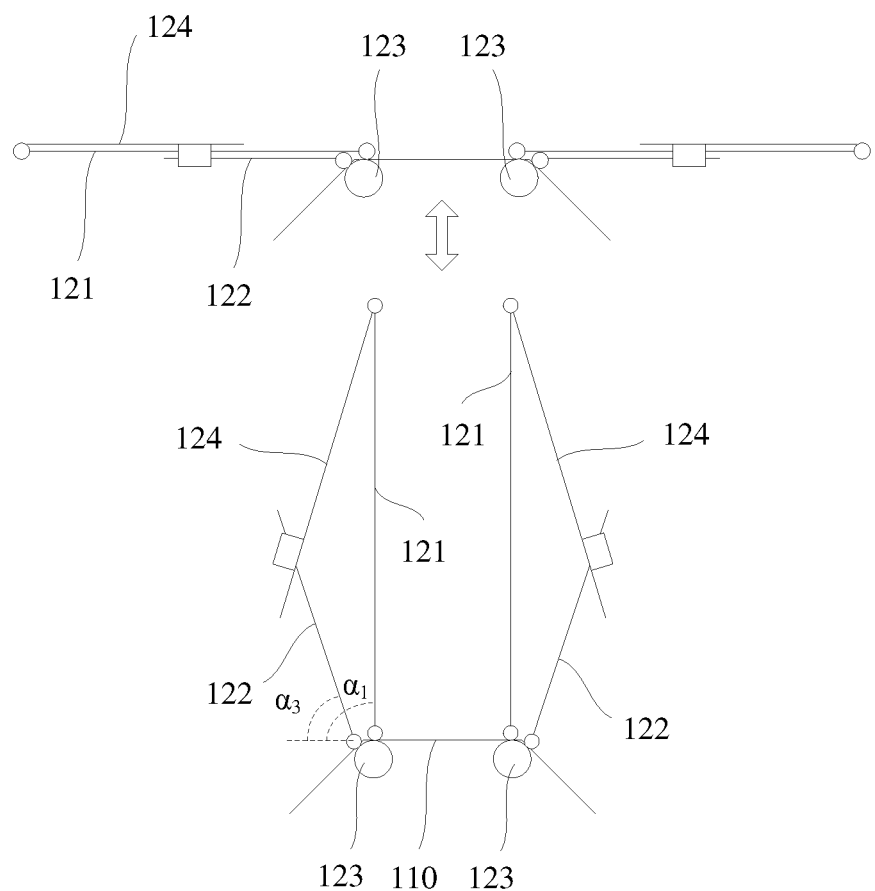
FIG. 8 is a brief motion diagram of a foldable hinge according to an embodiment of the present disclosure.

FIG. 8 is a brief motion diagram of a foldable hinge according to an embodiment of the present disclosure. As shown in FIG. 8, the foldable hinge changes from an unfolded state to a folded state. The rotation angle of the first swing arm 121 is $\alpha_1$, and the rotation angle of the second swing arm 122 is $\alpha_3$. Because the rotation angle of the second swing arm 122 is smaller, the support component 124 is enabled to rotate relative to the first swing arm 121, and the two support components 124 are inclined relative to each other. The two support components 124 and the base 110 enclose space similar to a water drop shape, to accommodate a folded part of the flexible screen, so that the folded part of the flexible screen is bent in a water drop shape.

As shown in FIG. 7, the first swing arm 121 and the second swing arm 122 are spaced apart in a direction parallel to an axis $m_4$ of the synchronous gear 123. The first swing arm 121 includes a first main body portion 1211 and a first gear portion 1212, and the first gear portion 1212 is located on a side that is of the first main body portion 1211 and that is close to the second swing arm 122. The second swing arm 122 includes a second main body portion 1221 and a second gear portion 1222, and the second gear portion 1222 is located on a side that is of the second main body portion 1221 and that is close to the first swing arm 121. The synchronous gear 123 is located between the first main body portion 1211 and the second main body portion 1221, and is engaged with the first gear portion 1212 and the second gear portion 1222.

The first gear portion 1212 of the first swing arm 121 and the second gear portion 1222 of the second swing arm 122 are engaged with the synchronous gear 123, so that when the first swing arm 121 rotates, the synchronous gear 123 can be driven to rotate, and then the synchronous gear 123 drives the second swing arm 122 to rotate. Transmission by using the gear helps implement a compact structure and stable transmission with high efficiency and high reliability.

In this embodiment of the present disclosure, a diameter of the first gear portion 1212 is less than a diameter of the second gear portion 1222, so that a transmission ratio of the synchronous gear 123 to the first gear portion 1212 is less than a transmission ratio of the synchronous gear 123 to the second gear portion 1222.

The first swing arm 121, the second swing arm 122, and the synchronous gear 123 may be connected to the base 110 by using a pin shaft. For example, as shown in FIG. 7, the first swing arm 121 is connected to the base 110 by using a first pin shaft 131. The first main body portion 1211 of the first swing arm 121 has a first connection hole, and the first connection hole is coaxially arranged with the first gear portion 1212. The first pin shaft 131 is mounted in the base 110, and the first connection hole is sleeved outside the first pin shaft 131, so that the first swing arm 121 can rotate around the first pin shaft 131. In addition, in a rotation process, the first gear portion 1212 also rotates around an axis of the first gear portion 1212, to drive the synchronous gear 123.

The second swing arm 122 is connected to the base 110 by using a second pin shaft 132. The second pin shaft 132 is located on a side that is of the second main body portion 1221 of the second swing arm 122 and that is far away from the second gear portion 1222, and the second pin shaft 132 is connected to the base 110, so that the second swing arm 122 can rotate around the second pin shaft 132. The second pin shaft 132 is in a clearance fit with one of the second main body portion 1221 and the base 110, and is in a transition fit with or of an integrated structure with the other of the second main body portion 1221 and the base 110.

For example, in some examples, the second main body portion 1221 has a second connection hole. The second pin shaft 132 is in a clearance fit with the second connection hole. The second pin shaft 132 and the base 110 are of an integrated structure. Alternatively, a receptacle is disposed in the base 110, and the second pin shaft 132 is inserted in the receptacle and is in a clearance fit or transition fit with the receptacle. In some other examples, the second pin shaft 132 and the second main body portion 1221 are of an integrated structure. The receptacle is disposed on the base 110, the second pin shaft 132 is inserted in the receptacle, and the second pin shaft 132 is in a clearance fit with the receptacle.

The synchronous gear 123 may be connected to the base 110 by using a third pin shaft 133. The third pin shaft 133 is mounted in the base 110, the synchronous gear 123 has an axial through hole, and the synchronous gear 123 is sleeved outside the third pin shaft 133 through the axial through hole. The third pin shaft 133 is in a clearance fit with the axial through hole, so that the synchronous gear 123 can rotate relative to the third pin shaft 133.

As shown in FIG. 7, a spacing between axes $m_4$ of synchronous gears 123 of the two folding assemblies 120 is less than a spacing between pivotal connection axes $m_1$ between first swing arms 121 of the two folding assemblies 120 and the base 110, and is also less than a spacing between pivotal connection axes $m_2$ between second swing arms 122 of the two folding assemblies 120 and the base 110.

In this embodiment of the present disclosure, a spacing between third pin shafts 133 of the two folding assemblies 120 is less than a spacing between second pin shafts 132 of the two folding assemblies 120, and is also less than a spacing between first pin shafts 131 of the two folding assemblies 120. This helps reduce a volume of the base 110, so that a size of the foldable hinge can be designed to be smaller.

Figure 9:
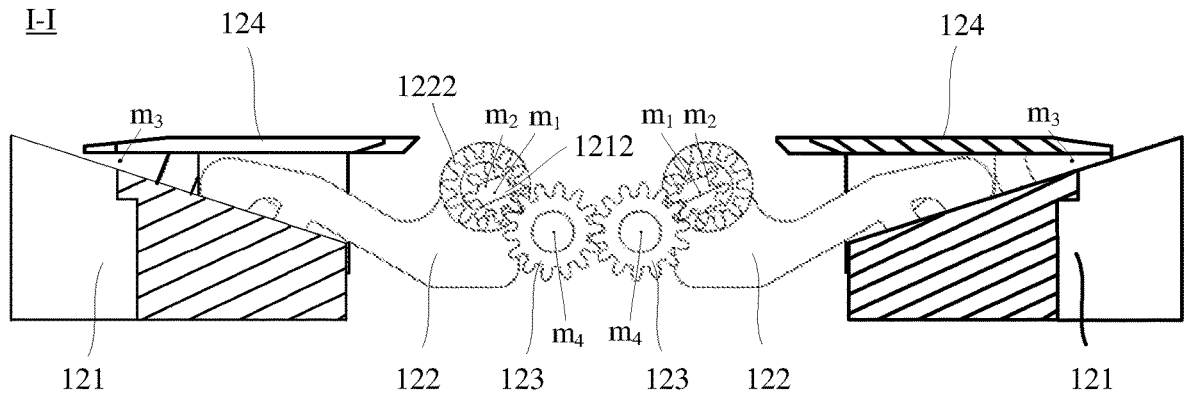
FIG. 9 is an I-I sectional view of the foldable hinge in FIG. 7.

FIG. 9 is an I-I sectional view of the foldable hinge in FIG. 7. As shown in FIG. 9, orthographic projections of the first gear portion 1212 and the second gear portion 1222 on a plane perpendicular to the axis of the synchronous gear 123 at least partially overlap.

The first gear portion 1212 and the second gear portion 1222 are staggered in a direction parallel to the axis of the synchronous gear 123, and interact with each other through the synchronous gear 123. When the first swing arm 121 and the second swing arm 122 are arranged, the first gear portion 1212 and the second gear portion 1222 can be engaged with the synchronous gear 123. In this embodiment of the present disclosure, the first gear portion 1212 and the second gear portion 1222 are arranged close, so that the orthographic projections of the first gear portion 1212 and the second gear portion 1222 on the plane perpendicular to the axis of the synchronous gear 123 partially overlap. In this way, an overall structure of the foldable hinge is more compact, and a size of the foldable hinge can be designed to be smaller.

As shown in FIG. 9, the synchronous gears 123 of the two folding assemblies 120 are engaged. The two synchronous gears 123 are engaged, so that the two folding assemblies 120 can move synchronously in a process of folding and unfolding the folding assemblies 120.

Figure 10:
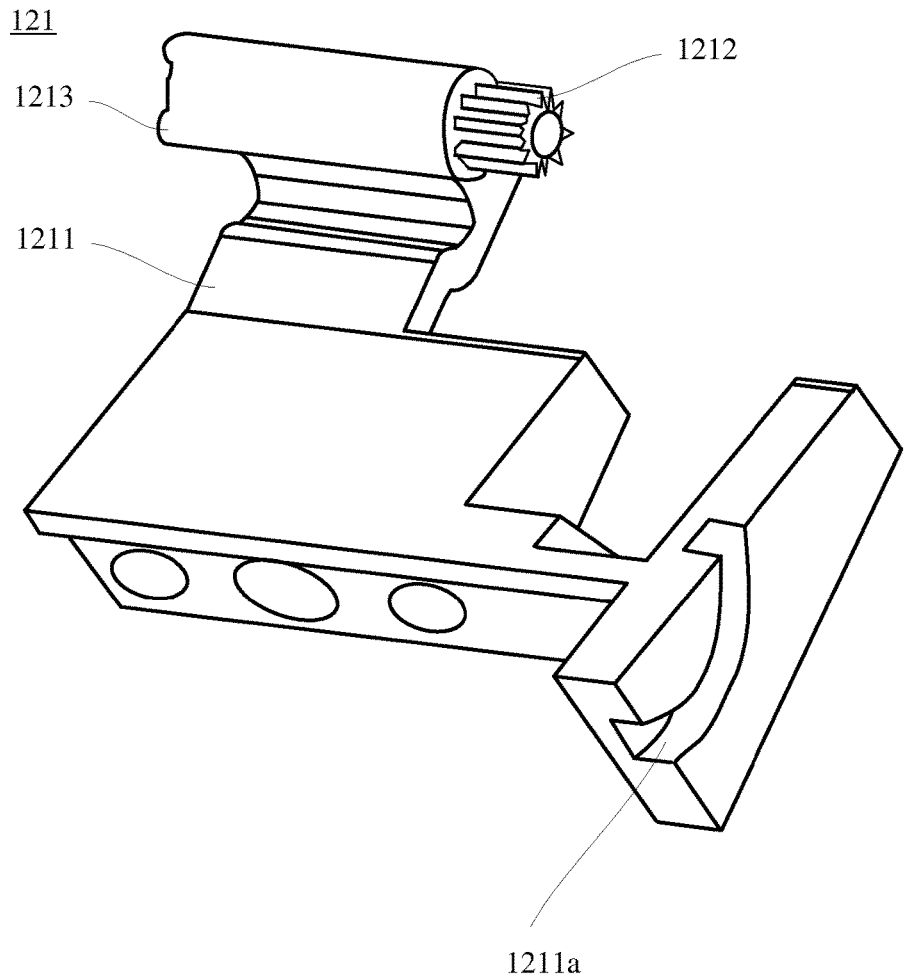
FIG. 10 is a schematic diagram of a structure of a first swing arm according to an embodiment of the present disclosure.

FIG. 10 is a schematic diagram of a structure of a first swing arm according to an embodiment of the present disclosure. As shown in FIG. 10, the first swing arm 121 further includes a first end face cam 1213. The first end face cam 1213 is located on a side that is of the first main body portion 1211 and that is far away from the first gear portion 1212. The first end face cam 1213 is coaxially arranged with the first gear portion 1212.

Figure 11:
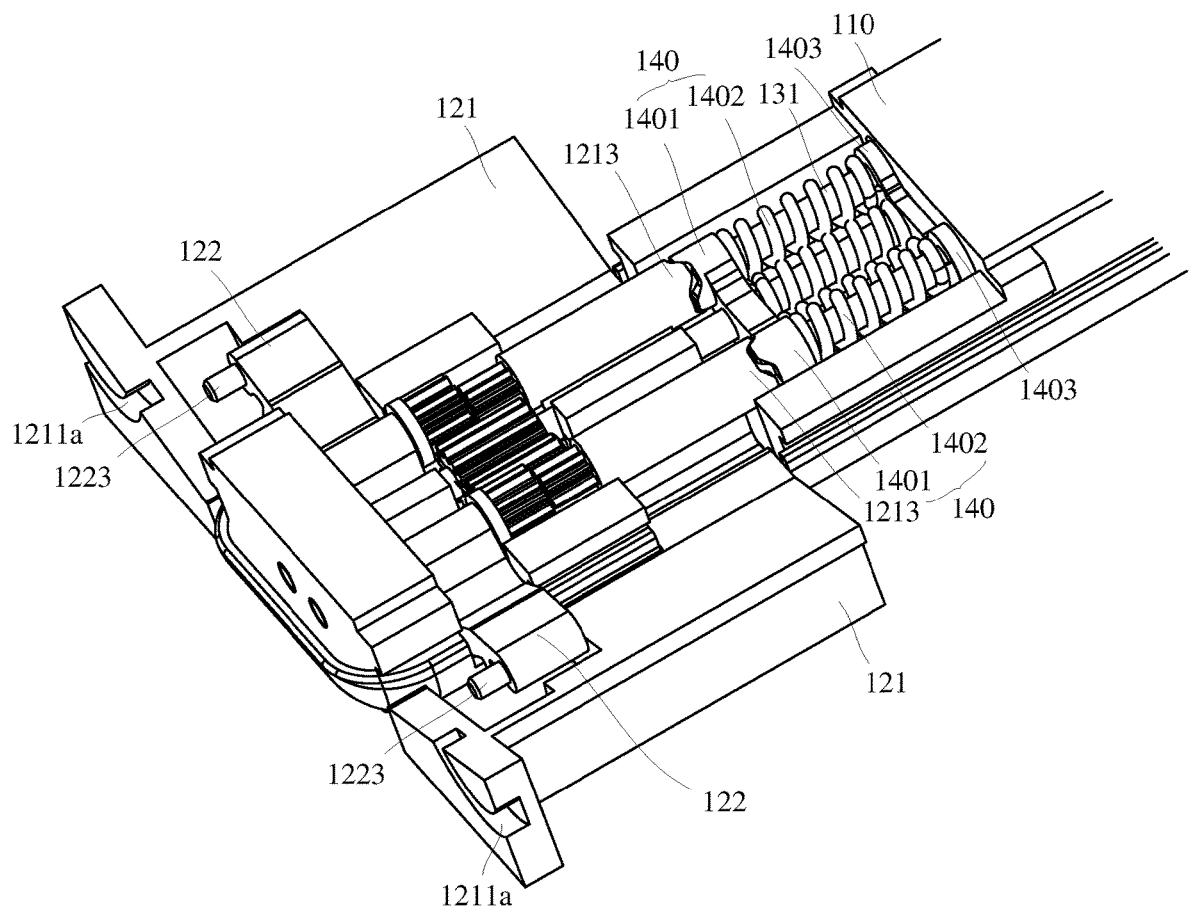
FIG. 11 is a schematic diagram of a partial structure of a foldable hinge according to an embodiment of the present disclosure.

FIG. 11 is a schematic diagram of a partial structure of a foldable hinge according to an embodiment of the present disclosure. As shown in FIG. 11, the foldable hinge further includes a damping mechanism 140. The damping mechanism 140 is located in the base 110, and the damping mechanism 140 is located on a side that is of the first main body portion 1211 and that is far away from the first gear portion 1212. The damping mechanism 140 fits an end face that is of the first end face cam 1213 and that is far away from the first main body portion 1211.

In a process in which an electronic device is used, folding is usually performed by a user by exerting an external force. The damping mechanism 140 can provide damping in a folding process, so that after the user removes the external force, the electronic device can be kept in a form in which the external force is removed. For example, after the two folding assemblies 120 are fully unfolded, the damping provided by the damping mechanism 140 keeps the foldable hinge in an unfolded state, so that the electronic device is in an unfolded state. After the two folding assemblies 120 are folded, the damping provided by the damping mechanism 140 keeps the foldable hinge in a folded state, so that the electronic device is in a folded state and may not unfold automatically under the influence of gravity or the like. When the two folding assemblies 120 are in a state between a fully unfolded state and a folded state, the electronic device is in a semi-unfolded state. For example, the flexible screen 400 is folded by 90°. In this case, the external force is removed, and the damping provided by the damping mechanism 140 can also keep the foldable hinge in the semi-unfolded state.

The damping mechanism 140 fits the first end face cam 1213 to provide resistance to the first swing arm 121 and hinder rotation of the first swing arm 121. When folding is performed through an external force, an external force exerted on the first swing arm 121 exceeds resistance exerted on the first swing arm 121 by the damping mechanism 140, and the first swing arm 121 can rotate. After the external force is removed, the first swing arm 121 is kept at a current position under an action of the resistance provided by the damping mechanism 140, so that the electronic device is kept in a form in which the external force is removed.

As shown in FIG. 11, the damping mechanism 140 includes a second end face cam 1401 and an elastic component 1402. The second end face cam 1401 is located on an end that is of the first end face cam 1213 and that is far away from the first main body portion 1211, and the first end face cam 1213 is coaxially arranged with the second end face cam 1401. The elastic component 1402 is located on an end that is of the second end face cam 1401 and that is far away from the first end face cam 1213. The elastic component 1402 is configured to provide an elastic force, to enable the second end face cam 1401 to touch the first end face cam 1213.

In this embodiment of the present disclosure, the second end face cam 1401 is sleeved outside the first pin shaft 131, the second end face cam 1401 can move along an axial direction of the first pin shaft 131, and the second end face cam 1401 and the first pin shaft 131 are locked circumferentially, so that the second end face cam 1401 cannot rotate circumferentially relative to the first pin shaft 131.

For example, in this embodiment of the present disclosure, the second end face cam 1401 and the elastic component 1402 are disposed on each of first swing arms 121 corresponding to the two folding assemblies 120. Two second end face cams 1401 are respectively sleeved outside two first pin shafts 131, and the two second end face cams 1401 are connected. The two second end face cams 1401 are sleeved outside two different pin shafts. Therefore, the two second end face cams 1401 are connected, so that circumferential limiting can be performed on the two second end face cams 1401 to enable the second end face cam 1401 and the first pin shaft 131 to be circumferentially locked.

In some examples, the elastic component 1402 is a spring, and the spring is sleeved outside the first pin shaft 131. The damping mechanism 140 may further include a snap ring 1403. The snap ring 1403 is sleeved outside the first pin shaft 131, and the spring is located between the second end face cam 1401 and the snap ring 1403. Axial limiting is performed on the spring by using the snap ring 1403, to prevent the spring from being loose.

Figure 12:
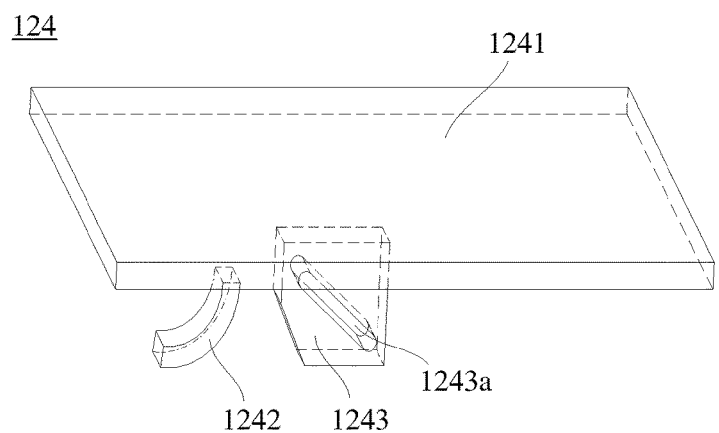
FIG. 12 is a schematic diagram of a structure of a support component according to an embodiment of the present disclosure.

FIG. 12 is a schematic diagram of a structure of a support component according to an embodiment of the present disclosure. As shown in FIG. 12, the support component 124 includes a plate body 1241 and an arc-shaped arm 1242. The arc-shaped arm 1242 is located on a side that is of the plate body 1241 and that is close to the first swing arm 121, and the arc-shaped arm 1242 is located on a side of the first swing arm 121. An end of the arc-shaped arm 1242 is connected to the plate body 1241, and the other end of the arc-shaped arm 1242 extends in a direction away from the base 110.

As shown in FIG. 10, a side wall that is of the first swing arm 121 and that is close to the arc-shaped arm 1242 has an arc-shaped groove 1211a. The arc-shaped arm 1242 is located in the arc-shaped groove 1211a, and the arc-shaped arm 1242 is capable of sliding along the arc-shaped groove 1211a.

In this embodiment of the present disclosure, the first main body portion 1211 of the first swing arm 121 is L-shaped. One end of the first main body portion 1211 is pivotally connected to the base 110, and the arc-shaped groove 1211a is located on an end face of the other end of the first main body portion 1211.

The arc-shaped arm 1242 fits the arc-shaped groove 1211a, so that the support component 124 can rotate around an axis of the arc-shaped groove 1211a, that is, the pivotal connection axis $m_3$, relative to the first swing arm 121.

In a conventional technology, a pole component such as a pin shaft is usually used for a pivotal connection, and a pivotal connection axis coincides with an axis of the pin shaft. Therefore, a position of the pivotal connection axis is limited by a position of the pin shaft. In this embodiment of the present disclosure, the arc-shaped arm 1242 fits the arc-shaped groove 1211a to implement the pivotal connection. Both the arc-shaped arm 1242 and the arc-shaped groove 1211a are in an arc shape. A pivotal connection axis is located at an axis of the arc-shaped arm 1242 or the arc-shaped groove 1211a. Radiuses of the arc-shaped arm 1242 and the arc-shaped groove 1211a are changed, so that a position of the pivotal connection axis can be changed. This is not limited to a structure such as a pin shaft, and an arrangement is more flexible.

As shown in FIG. 12, the support component 124 further includes a driving portion 1243. The driving portion 1243 and the arc-shaped arm 1242 are located on a same side of the plate body 1241, and the driving portion 1243 is located on a side of the second swing arm 122. The driving portion 1243 has a driving groove 1243a, and the driving groove 1243a is located on a side that is of the driving portion 1243 and that is close to the second swing arm 122.

In this embodiment of the present disclosure, the driving portion 1243 is located on a side that is of the arc-shaped arm 1242 and that is close to the second swing arm 122, that is, located between the second swing arm 122 and the arc-shaped arm 1242, so that structures of the first swing arm 121, the second swing arm 122, and the support component 124 are more compact. In addition, the driving portion 1243 is located on a side that is of the pivotal connection axis $m_3$ between the support component 124 and the first swing arm 121 and that is close to the base 110. In a process in which the two folding assemblies 120 fold, the rotation angle of the second swing arm 122 is smaller than the rotation angle of the first swing arm 121, and the driving groove 1243a is closer to the base 110 than the pivotal connection axis $m_3$. Therefore, the two support components 124 move close to each other and are in a splayed shape.

Figure 13:
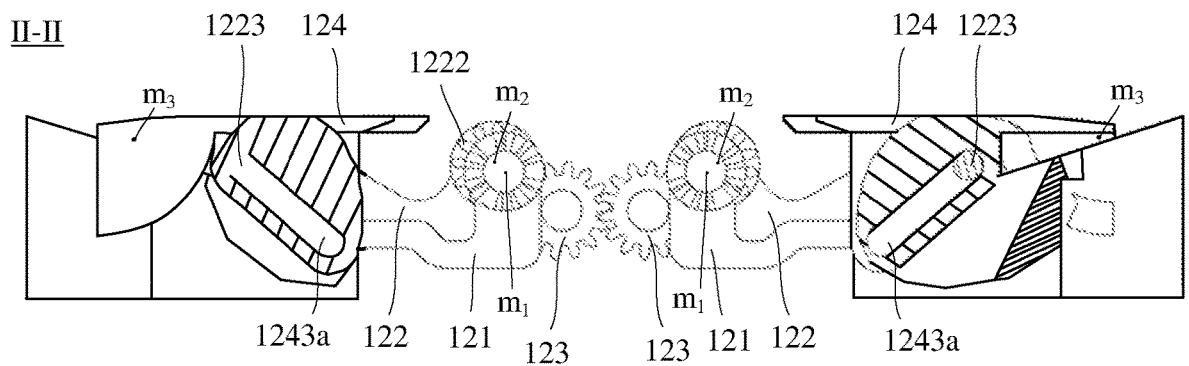
FIG. 13 is an II-II sectional view of the foldable hinge in FIG. 7.

As shown in FIG. 11, a side wall of the second swing arm 122 has a driving protrusion 1223. The driving protrusion 1223 is located on a side that is of the second swing arm 122 and that is close to the driving portion 1243. FIG. 13 is an II-II sectional view of the foldable hinge in FIG. 7. As shown in FIG. 13, the driving protrusion 1223 is partially located in the driving groove 1243a.

In this embodiment of the present disclosure, one end of the second main body portion 1221 of the second swing arm 122 is pivotally connected to the base 110, and the driving protrusion 1223 is located on the other end of the second main body portion 1221, that is, located on an end that is of the second main body portion 1221 and that is far away from the base 110. The driving protrusion 1223 is cylindrical, and an end of the driving protrusion 1223 is connected to the second main body portion 1221. The driving protrusion 1223 is parallel to the pivotal connection axis $m_2$ between the second swing arm 122 and the base 110.

When the second swing arm 122 rotates relative to the base 110, the driving protrusion 1223 touches a side wall of the driving groove 1243a, and squeezes the side wall of the driving groove 1243a to push the driving portion 1243. In this way, the support component 124 rotates around the pivotal connection axis $m_3$. When the foldable hinge is in an unfolded state, the driving protrusion 1223 is located at an end that is of the driving groove 1243a and that is far away from the base 110. When the foldable hinge is in a folded state, the driving protrusion 1223 is located at an end that is of the driving groove 1243a and that is close to the base 110.

As shown in FIG. 1, the electronic device further includes a top plate 150. The top plate 150 is located on the top of the top plate 150 and is connected to the base 110. The top plate 150 can play a blocking and protection role, block the base 110 and an internal structure of the base 110, and prevent an external foreign matter from entering the base 110 to affect normal operating of the foldable hinge 100. The top plate 150 may further provide a planar region, to facilitate support of the flexible screen 400.

Figure 14:
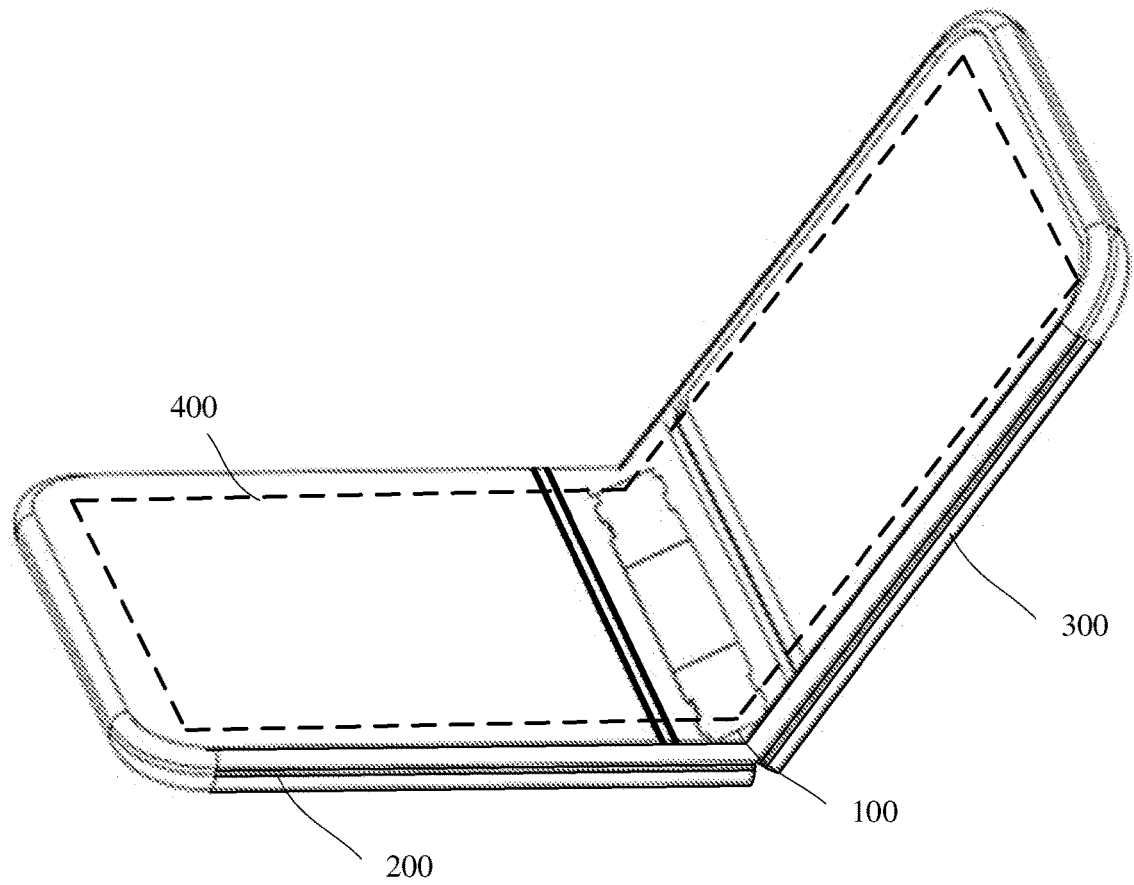
FIG. 14 is a schematic diagram of a structure of an electronic device according to an embodiment of the present disclosure.

FIG. 14 is a schematic diagram of a structure of an electronic device according to an embodiment of the present disclosure. As shown in FIG. 14, the electronic device includes a foldable hinge 100, a first housing 200, a second housing 300, and a flexible screen 400. The foldable hinge 100 is any foldable hinge shown in FIG. 1 to FIG. 13. The first housing 200 is connected to a first swing arm 121 of one folding assembly 120 in the foldable hinge 100, and the second housing 300 is connected to a first swing arm 121 of the other folding assembly 120 in the foldable hinge 100. The flexible screen 400 is located on a same side of the foldable hinge 100, the first housing 200, and the second housing 300, and is connected to the first housing 200 and the second housing 300.

In a process of opening or closing the first housing 200 and the second housing 300, a support component 124 may perform a double-rotation motion. That is, the support component 124 rotates relative to a base 110 together with the first swing arm 121, and rotates relative to the first swing arm 121. In this way, before and after folding is performed, relative positions of the support component 124 and the first swing arm 121 may change, so that when the two folding assemblies 120 are folded, the two support components 124 may present a specific included angle. Transmission between the first swing arm 121 and a second swing arm 122 is performed by using a synchronous gear 123. This has a simple structure, is convenient for manufacturing, and has low costs.

The electronic device includes two foldable hinges 100, and bases 110 of the two foldable hinges 100 are connected as a whole. In the two foldable hinges 100, support components 124 of the folding assemblies 120 close to the first housing 200 are connected as a whole, and support components 124 of the folding assemblies 120 close to the second housing 300 are connected as a whole, so that the two foldable hinges 100 move more synchronously.

A quantity of foldable hinges 100 in the electronic device may be set based on a size of the electronic device. For an electronic device of a small size, a small quantity of foldable hinges 100 may be disposed, for example, one or two foldable hinges 100 are disposed. For an electronic device of a large size, a large quantity of foldable hinges 100 may be disposed, for example, three or more foldable hinges 100 are disposed.

The foregoing descriptions are merely embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A foldable hinge, comprising a base and two folding assemblies, wherein the two folding assemblies are located on two sides of the base, are both connected to the base, and are capable of being opened or closed relative to each other;
   each of the two folding assemblies comprises a first swing arm, a second swing arm, a synchronous gear, and a support component;
   the first swing arm is pivotally connected to the base;
   the second swing arm is pivotally connected to the base, and a pivotal connection axis (m2) between the second swing arm and the base is parallel to a pivotal connection axis (m1) between the first swing arm and the base;
   the synchronous gear is located in the base, and the first swing arm and the second swing arm are connected through transmission by the synchronous gear; and
   the support component is pivotally connected to the first swing arm, is linked to the second swing arm, and is capable of rotating relative to the first swing arm under an action of the second swing arm;
   wherein the support component comprises a plate body and an arc-shaped arm, the arc-shaped arm is located on a side of the plate body proximal to the first swing arm, and is located on a side of the first swing arm, an end of the arc-shaped arm is connected to the plate body, and an other end extends in a direction away from the base; and
   a side wall of the first swing arm proximal to the arc-shaped arm has an arc-shaped groove, and the arc-shaped arm is located in the arc-shaped groove, and is capable of sliding along the arc-shaped groove;
   wherein the support component further comprises a driving portion, the driving portion and the arc-shaped arm are located on a same side of the plate body, the driving portion is located on a side of the second swing arm, the driving portion has a driving groove, and the driving groove is located on a side of the driving portion proximal to the second swing arm; and a side wall of the second swing arm has a driving protrusion, and the driving protrusion is located on a side of the second swing arm proximal to the driving portion, and is partially located in the driving groove.

2. The foldable hinge according to claim 1, wherein a transmission ratio of the synchronous gear to the first swing arm is less than a transmission ratio of the synchronous gear to the second swing arm.

3. The foldable hinge according to claim 1, wherein the first swing arm and the second swing arm are spaced apart in a direction parallel to an axis of the synchronous gear;
   the first swing arm comprises a first main body portion and a first gear portion, and the first gear portion is located on a side of the first main body portion proximal to the second swing arm;
   the second swing arm comprises a second main body portion and a second gear portion, and the second gear portion is located on a side of the second main body portion proximal to the first swing arm; and
   the synchronous gear is located between the first main body portion and the second main body portion, and is engaged with the first gear portion and the second gear portion.

4. The foldable hinge according to claim 3, wherein orthographic projections of the first gear portion and the second gear portion on a plane perpendicular to the axis of the synchronous gear at least partially overlap.

5. The foldable hinge according to claim 1, wherein a spacing between axes ($m_4$) of the synchronous gears of the two folding assemblies is less than a spacing between pivotal connection axes ($m_1$) between each of the first swing arms of the two folding assemblies and the base, and less than a spacing between pivotal connection axes ($m_2$) between each of the second swing arms of the two folding assemblies and the base.

6. The foldable hinge according to claim 1, wherein the synchronous gears of the two folding assemblies are engaged.

7. The foldable hinge according to claim 3, wherein the first swing arm further comprises a first end face cam, the first end face cam is located on a side of the first main body portion distal from the first gear portion, and the first end face cam is coaxially arranged with the first gear portion; and the foldable hinge further comprises a damping mechanism, the damping mechanism is located in the base and is located on the side of the first main body portion distal from the first gear portion, and the damping mechanism fits an end face of the first end face camdistal from the first main body portion.

8. The foldable hinge according to claim 7, wherein the damping mechanism comprises a second end face cam and an elastic component, the second end face cam is located on an end of the first end face cam distal from the first main body portion, and is coaxially arranged with the first end face cam, and the elastic component is located on an end of the second end face cam distal from the first end face cam, and is configured to provide an elastic force, to enable the second end face cam to touch the first end face cam.

9. An electronic device, comprising a foldable hinge, a first housing, a second housing, and a flexible screen;

wherein the foldable hinge comprises a base and two folding assemblies, wherein the two folding assemblies are located on two sides of the base, are both connected to the base, and are capable of being opened or closed relative to each other;

each of the two folding assemblies comprises a first swing arm, a second swing arm, a synchronous gear, and a support component;

the first swing arm is pivotally connected to the base;

the second swing arm is pivotally connected to the base, and a pivotal connection axis (m2) between the second swing arm and the base is parallel to a pivotal connection axis (m1) between the first swing arm and the base;

the synchronous gear is located in the base, and the first swing arm and the second swing arm are connected through transmission by the synchronous gear; and the support component is pivotally connected to the first swing arm, is linked to the second swing arm, and is capable of rotating relative to the first swing arm under an action of the second swing arm, and wherein the support component comprises a plate body and an arc-shaped arm, the arc-shaped arm is located on a side of the plate body proximal to the first swing arm, and is located on a side of the first swing arm, an end of the arc-shaped arm is connected to the plate body, and another end extends in a direction away from the base; and a side wall of the first swing arm proximal to the arc-shaped arm has an arc-shaped groove, and the arc-shaped arm is located in the arc-shaped groove, and is capable of sliding along the arc-shaped groove;

wherein the support component further comprises a driving portion, the driving portion and the arc-shaped arm are located on a same side of the plate body, the driving portion is located on a side of the second swing arm, the driving portion has a driving groove, and the driving groove is located on a side of the driving portion proximal to the second swing arm; and a side wall of the second swing arm has a driving protrusion, and the driving protrusion is located on a side of the second swing arm proximal to the driving portion, and is partially located in the driving groove;

wherein the first housing is connected to the first swing arm of one of the two folding assemblies in the foldable hinge, the second housing is connected to the first swing arm of another one of the two folding assemblies in the foldable hinge, and the flexible screen is located on a same side of the foldable hinge, the first housing, and the second housing, and is connected to the first housing and the second housing.

10. The electronic device according to claim 9, wherein a transmission ratio of the synchronous gear to the first swing arm is less than a transmission ratio of the synchronous gear to the second swing arm.

11. The electronic device according to claim 9, wherein the first swing arm and the second swing arm are spaced apart in a direction parallel to an axis of the synchronous gear;

the first swing arm comprises a first main body portion and a first gear portion, and the first gear portion is located on a side of the first main body portion proximal to the second swing arm;

the second swing arm comprises a second main body portion and a second gear portion, and the second gear portion is located on a side of the second main body portion proximal to the first swing arm; and the synchronous gear is located between the first main body portion (and the second main body portion, and is engaged with the first gear portion and the second gear portion.

12. The electronic device according to claim 11, wherein orthographic projections of the first gear portion and the second gear portion on a plane perpendicular to the axis of the synchronous gear at least partially overlap.

13. The electronic device according to claim 9, wherein a spacing between axes ($m_4$) of synchronous gears of the two folding assemblies is less than a spacing between pivotal connection axes ($m_1$) between each of the first swing arms of the two folding assemblies and the base, and less than a spacing between pivotal connection axes ($m_2$) between each of the second swing arms of the two folding assemblies and the base.

14. The electronic device according to claim 9, wherein the synchronous gears of the two folding assemblies are engaged.

15. The electronic device according to claim 11, wherein the first swing arm further comprises a first end face cam, the first end face cam is located on a side of the first main body portion distal from the first gear portion, and the first end face cam is coaxially arranged with the first gear portion; and the foldable hinge further comprises a damping mechanism, the damping mechanism is located in the base and is located on the side of the first main body portion distal from the first gear portion, and the damping mechanism fits an end face of the first end face camdistal from the first main body portion.

16. The electronic device according to claim 15, wherein the damping mechanism comprises a second end face cam and an elastic component, the second end face cam is located on an end of the first end face cam distal from the first main body portion, and is coaxially arranged with the first end face cam, and the elastic component is located on an end of the second end face cam distal from the first end face cam, and is configured to provide an elastic force, to enable the second end face cam to touch the first end face cam.

* * * * *